S. R. COPPINS.
ROLLER BEARING.
APPLICATION FILED DEC. 12, 1917.

1,295,855.

Patented Mar. 4, 1919.

Inventor
Scott R. Coppins
FitzGerald & Co.
Attorneys

UNITED STATES PATENT OFFICE.

SCOTT R. COPPINS, OF PRINCETON, ILLINOIS.

ROLLER-BEARING.

1,295,855.   Specification of Letters Patent.   Patented Mar. 4, 1919.

Application filed December 12, 1917. Serial No. 206,778.

*To all whom it may concern:*

Be it known that I, SCOTT R. COPPINS, a citizen of the United States, residing at Princeton, in the county of Bureau and State of Illinois, have invented certain new and useful Improvements in Roller-Bearings; and I do hereby declare the following to be a full, clear, and exact description of the invention, such as will enable others skilled in the art to which it appertains to make and use the same.

This invention relates to new and useful improvements in roller bearings and the main object of the invention is to produce a simple and inexpensive bearing which will be reliable and efficient in use.

Another object of the invention is to provide a roller bearing embodying inner and outer sleeves between which are positioned a plurality of spaced rollers which by virtue of their construction and arrangement will always remain in spaced relation to each other, means being provided intermediate the ends of the inner and outer sleeves to prevent movement of the rollers in a lateral direction.

A further object of the invention is to provide a roller bearing embodying inner and outer sleeves having their outer and inner surfaces corrugated between which are positioned a plurality of corrugated rollers, the corrugations of said roller meshing with those of the inner and outer sleeves to hold and maintain the rollers in spaced relation to each other.

A further object of the invention is to provide each roller with longitudinal corrugations whereby it will be caused to rotate and yet allow the roller to carry the direct load pressure rather than the corrugations which will increase the wearing qualities of the roller.

With these and other objects in view as will appear as the description proceeds, the invention comprises the various novel features of construction, combination and arrangement of parts as will be fully described hereinafter and afterward specifically claimed.

Referring to the drawings.

Similar characters of reference are used to denote corresponding parts throughout the accompanying drawings and the following description.

Figure 1:
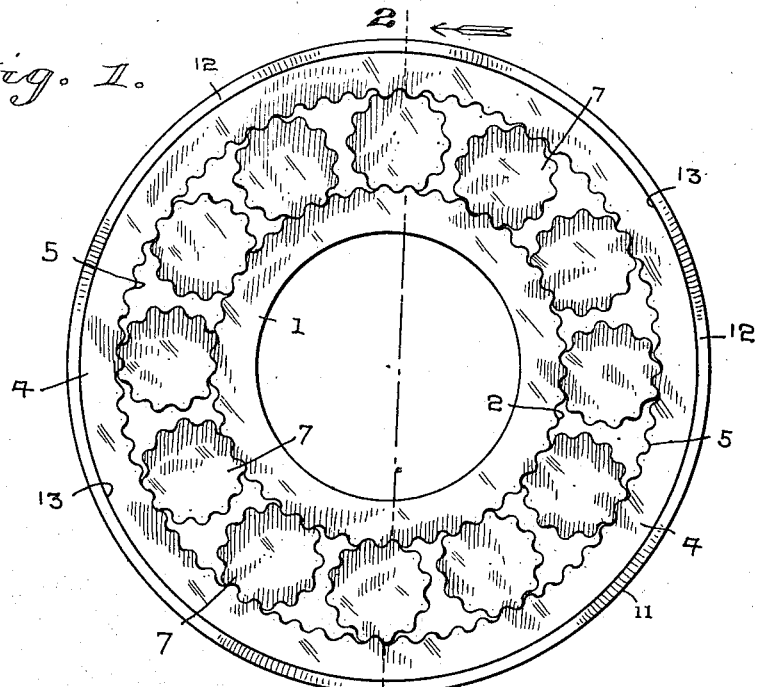
Figure 1 represents a side elevation of my improved roller bearing.
Figure 2:
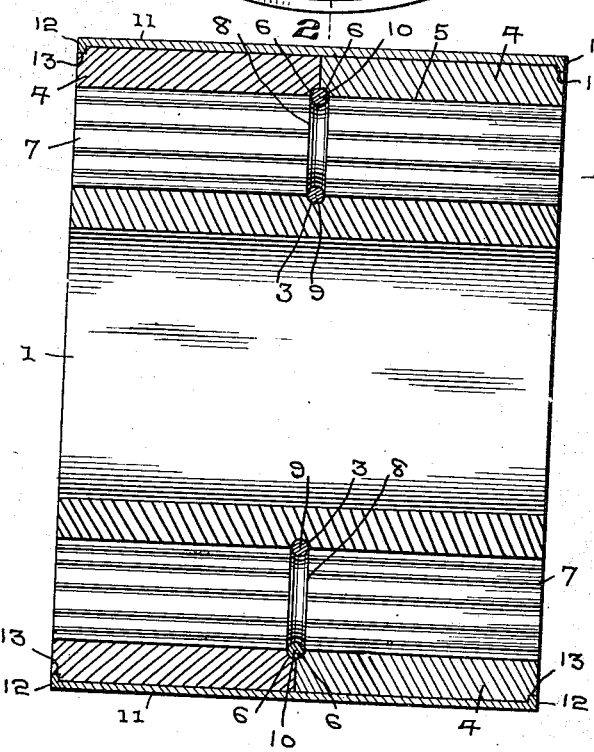
Fig. 2 represents a vertical transverse sectional view taken on the line 2—2 of figure.

In order that the construction and operation of the invention may be readily comprehended by those skilled in the art to which the invention relates, I have illustrated an approved embodiment thereof in the accompanying drawing and will now proceed to fully describe the same, in connection with said drawing, in which 1 indicates the inner sleeve provided circumferentially with transversely extending corrugations 2. 3 indicates a circumferential groove formed intermediate the ends of the sleeve.

An outer sleeve 4 is arranged concentrically of the inner sleeve and is formed of two parts arranged in abutting relation to each other and of a combined width to equal the width of said inner sleeve. Both parts of the outer sleeve are formed in their inner circumference with transverse corrugations 5. The inner circumferential edges of the abutting faces of the outer sleeve parts 4 are formed with grooves 6 which coöperate to form a semi-circular groove.

Longitudinally corrugated bearing rollers 7 are positioned between and in mesh with the inner and outer sleeves so that any revoluble movement imparted to either of said sleeves will be correspondingly imparted to said rollers. Each bearing roller is formed intermediate its ends with a circumferential groove 8 adapted to aline with the grooves 3 and 6 of the inner and outer sleeves respectively. In order to prevent movement of the roller transversely of the sleeves, a spring steel split ring 9 is arranged within the circumferential groove 3 so as to project into and fit the groove 8 of each roller. In order to doubly insure the rollers against lateral movement, I provide an additional spring steel split ring 10 which is arranged within the circumferential grooves 6 so as to project into and fit the groove 8 of each roller.

11 indicates a sleeve band positioned around the outer sleeve and has its opposite edges formed with inwardly extending beads 12 seated within circumferential rabbets 13 in the outer circumferential edges of the outer sleeve. These beads serve to hold both parts of the outer sleeve together and the spring steel ring 10 in position.

In assembling the bearing, the rollers are first positioned on the inner sleeve with the ring 9 in position. One part of the outer sleeve is then positioned over one end of the rollers and the spring steel ring 10 positioned in its respective groove, after which the remaining part 4 is arranged over the other ends of the rollers in abutting position to the first mentioned outer sleeve part. The sleeve band is then positioned over the outer sleeve parts and its circumferential edges beaded into the rabbets 13.

By making the rollers with corrugations rather than cog teeth, it will be apparent that each roller will carry the direct load strain, whereas if they were provided with teeth, the latter would carry the load strain rather than the roller and thus decrease the life and wearing qualities of the roller.

Figure 3:
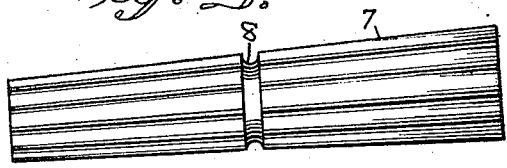
Fig. 3 represents a detail elevation of a modified form of bearing roller.

In Fig. 3 is shown a tapered roller for use in end thrust bearings but which in other respects is identical in construction and operation with the previously described rollers.

It is to be further noted that by the absence of the roller trunnions and supporting rings, usual in the ordinary bearings, that a great deal of unnecessary friction and wear and tear of these respective parts is eliminated.

Having thus described my invention, what I claim as new, is:—

1. A roller bearing comprising an inner sleeve formed with transverse corrugations and provided intermediate its ends with a circumferential groove, a sectional outer sleeve formed interiorly with transverse corrugations and provided intermediate its ends with a circumferential groove in alinement with the first mentioned groove, longitudinally corrugated rollers positioned between and in mesh with said inner and outer sleeves and each formed intermediate of its ends with a circumferential groove, a retaining ring disposed within the circumferential groove of the inner sleeve and projecting into the corresponding groove of each roller, and a retaining ring positioned in the circumferential groove of the outer sleeve and projecting into the circumferential groove of each roller.

2. A roller bearing comprising an inner sleeve formed with transverse corrugations and provided intermediate its ends with a circumferential groove, a sectional outer sleeve formed interiorly with transverse corrugations and provided intermediate its ends with a circumferential groove in alinement with the first mentioned groove, longitudinally corrugated rollers positioned between and in mesh with said inner and outer sleeves and each formed intermediate of its ends with a circumferential groove, a spring retaining ring disposed within the circumferential groove of the inner sleeve and projecting into the corresponding groove of each roller, a spring retaining ring positioned in the circumferential groove of the outer sleeve and projecting into the circumferential groove of each roller, and means for securing the sections of the outer sleeve in position to prevent transverse movement of the parts.

3. A roller bearing comprising an inner sleeve formed exteriorly with transverse corrugations, an outer sleeve comprising two abutting parts formed interiorly with transverse corrugations, corrugated rollers arranged between and in mesh with said inner and outer sleeves, the corrugations of said parts serving to maintain the rollers in spaced relation to each other, means to prevent movement of the rollers transversely of said sleeves, and a sleeve band positioned around said outer sleeve.

4. A roller bearing comprising an inner sleeve formed exteriorly with transverse corrugations, an outer sleeve consisting of two abutting parts formed interiorly with transverse corrugations, the inner circumferential edges of the abutting faces of said outer sleeve parts being formed with co-acting grooves, corrugated rollers positioned between and in mesh with said inner and outer sleeves, each roller formed intermediate its ends with a circumferential groove, a spring ring positioned within the co-acting grooves of said outer sleeve parts and projecting within the circumferential groove of each roller, means to prevent relative transverse movement of the inner sleeve with respect to said rollers, and a sleeve band positioned around said outer sleeve.

5. A roller bearing comprising an inner sleeve formed exteriorly with transverse corrugations, an outer sleeve consisting of two abutting parts formed interiorly with transverse corrugations, the outer circumferential edge of each outer sleeve part being formed with a rabbet, means to prevent relative transverse movement of said rollers with respect to said inner and outer sleeves, and a sleeve band positioned around said outer sleeve and formed at its opposite circumferential edges with inwardly extending beads for engagement within said rabbets of the outer sleeve parts.

In testimony whereof I have signed my name to this specification in the presence of two subscribing witnesses.

SCOTT R. COPPINS.

Witnesses:
 IRWIN J. BERLIN,
 JOHN ROSENE.